LOUDSPEAKING TELEPHONE SYSTEMS

Filed Sept. 30, 1958

INVENTORS
ARTHUR IAN FORBES SIMPSON
WILLIAM ALEXANDER CAWTHRA
By E. J. Kalil
AGENT United States Patent Office 3,065,300
Patented Nov. 20, 1962

3,065,300

LOUDSPEAKING TELEPHONE SYSTEMS

Arthur Ian Forbes Simpson and William Alexander Cawthra, London, England, assignors to Modern Telephones (Great Britain) Limited, London, England, a British company Filed Sept. 30, 1958, Ser. No. 764,360
9 Claims. (Cl. 179—1)

This invention relates to loudspeaking telephone systems using an amplifier to amplify the signals fed to a loudspeaker and providing simultaneous two-way communication. In such a loudspeaking telephone system, which might, for example, have a hand-set at one station and a loudspeaker and microphone at the other station, or have loudspeakers and microphone at both stations with separate amplifiers, its is necessary to limit the loop gain of the electro-acoustic circuit. It is the common practice, therefore, in such arrangements to arrange for the gain of one path to be reduced by the signal in the reverse path, but such devices are normally quite complicated and it is one of the objects of the present invention to provide an improved arrangement for limiting the loop gain of such a system.

According to this invention, in a loudspeaking telephone system having an amplifier to amplify the signals fed to a loudspeaker and providing simultaneous two-way communication, a class B amplifier is employed and there is provided a current-controlled impedance controlled by the current in the power supply circuit to the amplifier or to the last stage thereof, which impedance is arranged in the return speech circuit to reduce the output of that circuit as the amplifier output increases. The current-controlled impedance in its simplest form may comprise a core with two coupled inductive windings so that the current through one winding controls the impedance of the second winding.

In one arrangement the aforementioned current-controlled impedance comprises a core having two inductive windings, the first of these windings being energised by a direct current dependent on the amplifier output and the second winding being connected in shunt across the return speech circuit so that increase in the amplifier output reduces the inductance of the second winding and thereby shunts the speech circuit across which the winding is connected to reduce the loop gain.

In another arrangement, the current-controlled impedance comprises a filament lamp, the impedance of which depends on the current passing through it; such a lamp may be connected in shunt across a primary winding of a transformer so as to control the impedance of a secondary winding. Preferably four filament lamps are used arranged in two pairs, the two lamps in each pair being connected in series and the two pairs being connected in shunt in the direct current power supply circuit to the amplifier or the last stage thereof; the primary winding of the transformer may be connected between the junction of the lamps in one pair and the junction of the lamps of the other pair. In the simplest form of such an arrangement the secondary winding may be connected in series in the return speech path. The four lamps constitute a balanced bridge so that no current variations due to speech currents in the return speech circuit are transmitted to the amplifier. Likewise any speech frequency components in the amplifier circuit would not affect the return speech path but, due to the variations in direct current, the resistance of the lamps would change with variations of speech energy and so produce a variation in the impedance of said secondary winding, that impedance rising with increased output of the amplifier. This impedance variation will be relatively slow compared with speech frequency, particularly if a capacitor is connected across the direct current circuit.

Such filament lamps serve also the additional purpose of acting as a protective device for preventing overloading of the amplifier since the latter operates as a class B amplifier. This is particularly desirable with transistor amplifiers in which particular care must be taken to ensure that the transistors are not overloaded and, if a filament lamp is included in the supply circuit, it can be arranged to reduce the voltage of the power supply to the amplifier (or to the last stage thereof which is the stage particularly requiring protection) as the input signal amplitude increases. In such a protective circuit, preferably a capacitor is connected across the input supply circuit so as to ensure a constant input supply voltage during short peaks of signals.

Instead of connecting the aforesaid secondary winding in series with the return speech circuit, preferably it is connected in one arm of a bridge circuit the other arms of which are resistive, which bridge circuit is connected in the return speech circuit with the input (return) speech signals applied across one diagonal, the output signals being taken from the other diagonal and the bridge being balanced or nearly balanced at maximum output of the forward path amplifier. It will be seen that, if the bridge is balanced, the return signals will be reduced to zero and by this arrangement the return signals can be reduced to almost any required degree. Preferably at least one arm of the bridge circuit is made adjustable for adjusting the balance of the bridge.

The above described arrangement might be used for a two-way communication system with similar loudspeakers and microphones at each station and, in this case, the above-described arrangement for reducing the loop gain is preferably duplicated so that the reduction in the return path gain can be obtained for speech communication in either direction.

The loop-gain reduction circuit described above, however, has particular application in a system employing a hand-set at one station and a loudspeaker with a microphone at the other station. In such an arrangement it is not generally possible to use a loop gain approaching unity since when the direction of speech transmission is from the hand-set to the loudspeaker since the user of a telephone hand-set is unable to accept an amount of "back-echo" which would be quite acceptable at a loudspeaker and microphone station. Thus the reduction in return path gain is particularly required for speech from the hand-set station to the loudspeaker station. In such an arrangement, a single control circuit may be employed, the output of the amplifier used for amplifying speech from the hand-set microphone to the loudspeaker being used to control the gain of the return path from that station so as to reduce the loop gain when the direction of speech transmission is from the hand-set to the loudspeaker.

In the following description reference will be made to the accompanying drawings in which.

Figure 1:
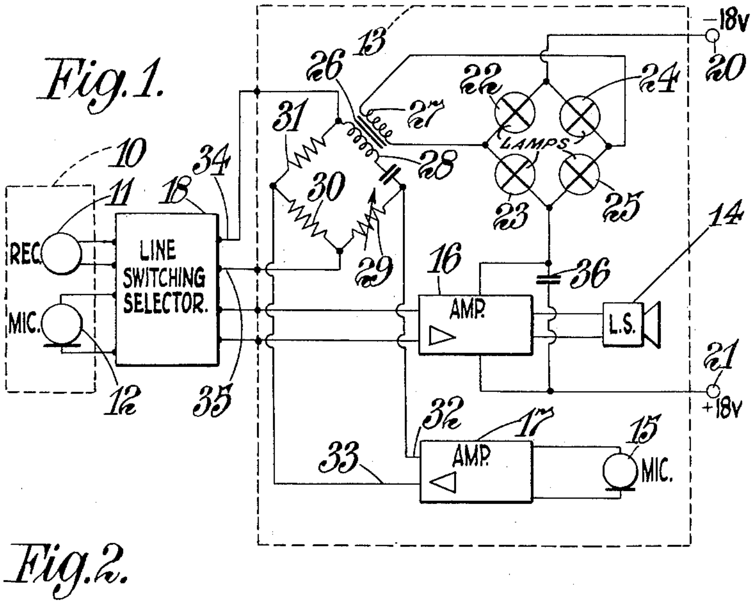
FIGURE 1 is a circuit diagram illustrating one embodiment of the invention.

Referring to FIGURE 1, there is illustrated diagrammatically an intercommunication telephone system having a station 10 comprising a receiver 11 and a microphone 12. A second station 13 has a loudspeaker 14 and a microphone 15. An amplifier 16 is provided for amplifying speech from the microphone 12 to the loudspeaker 14 and an amplifier 17 being provided to amplify signals from the microphone 15 to the receiver 11. These two stations may form part of an intercommunication system having a number of stations and the station 10 may, for example, be regarded as typical of a number of similar stations which may be connected to the station 13 by means of suitable line-switching selector equipment illustrated diagrammatically at 18.

The amplifiers 16, 17 are each a multi-stage transistor amplifier with the last stage operating in class B so that its demand from its power supply is substantially proportional to the power output of that stage. Suitable amplifiers for this purpose are described in further detail in co-pending United States application Serial No. 710,232, filed January 21, 1958.

Figure 2:
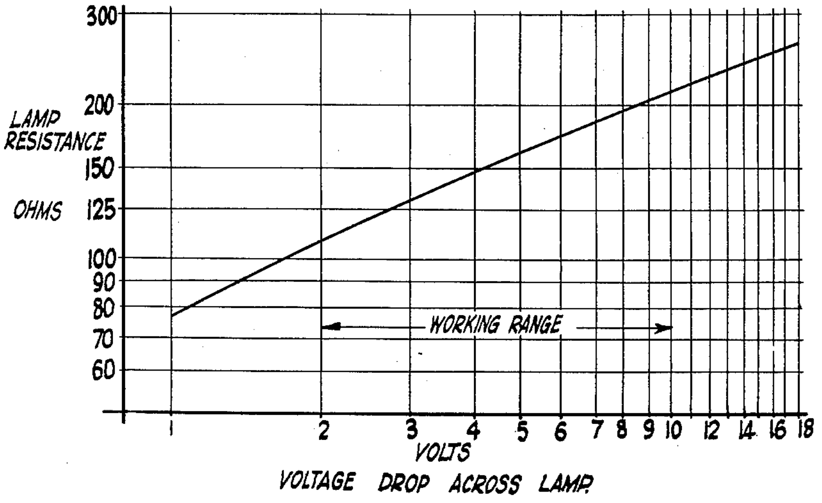
FIGURE 2 is a graphical diagram illustrating the voltage-resistance characteristic of a lamp such as is employed in the arrangement of FIGURE 1.

In a loudspeaking telephone system having two-way communication with separate amplifiers for the two directions of communication, it is necessary to limit the loop gain of the electro-acoustic circuit and it is to this that the present invention is more particularly directed. In the arrangement of FIGURE 1, the power supply current required for the amplifier 16 or for the last stage of this amplifier is taken from a supply circuit between terminals 20, 21 which supply circuit includes four filament lamps 22, 23, 24 and 25. The four lamps are arranged in two pairs 22, 23 and 24, 25 with the two lamps in each pair in series. The two pairs of series-connected lamps are arranged in shunt with one another in the supply circuit to the amplifier. These lamps 22 to 25 have a resistance-voltage characteristic as shown in the graphical diagram of FIGURE 2, which figure shows that the lamp resistance increases substantially as the voltage drop across the lamp increases. Hence as the power drawn by the amplifier 16 increases the resistance across the lamps 22 to 25 also increases.

A transformer 26 has a primary winding 27 the ends of which are connected respectively to the junction of the lamps 22 and 23 and the junction of the lamps 24 and 25. A secondary winding 28 of this transformer 26 is connected in one arm of a bridge circuit having three resistive arms 29, 30 and 31. The return speech lines 32, 33 from the output terminals of the amplifier 17 are connected across one diagonal of the bridge circuit formed by winding 28 and resistors 29—31. Across the other diagonal are connected speech lines 34, 35 leading to the receiver 11 at the station 10.

The bridge circuit formed by winding 28 and resistors 29—31 is arranged so as to be substantially in balance at maximum output of the forward path amplifier 16. It will be seen that when the bridge is balanced, the return signals will be reduced to zero and by this arrangement the return signals can be reduced to almost any required degree. As the output of the forward path amplifier 16 decreases, since it is a class B amplifier, the current drawn from the supply terminals 20, 21 will fall and the resistance of the lamps 22 to 25 will also fall. This puts the bridge out of balance so enabling signals to be passed along the return path through the bridge circuit 28—31 from the amplifier 17 to the receiver 11. Preferably one of the arms of the bridge, for example the arm 29, is made adjustable for adjusting the balance of the bridge.

Because the lamps 22 to 25 take a short time for the current through the lamps to reach a steady value when the current changes, there will be no sudden changes of gain in the return speech path due to short duration peaks in the amplitude of the output of the amplifier 16. A capacitor 36 is connected across the supply leads to the amplifier 16 and provides further smoothing of the supply voltage against short-term variations. It is found in practice that the time constant of the lamps and of the capacitive circuit take care of effects of the reverberation time of ordinary rooms.

The filament lamps 22—25 serve also for the additional purpose of preventing overloading of the amplifier 16 as the lamps can be arranged to reduce the voltage of the power supply to the amplifier as the signal amplitude increases.

The loop gain reduction circuit shown in FIGURE 1 is particularly applicable to an intercommunication system employing a hand-set at one station as, for example, the station 10 and having a loudspeaker with a microphone at the other station, for example station 13. The user of a telephone hand-set is unable to accept an amount of "back-echo" which would be quite acceptable at a loudspeaker and microphone station and hence the reduction in return path gain is particularly required for speech from the hand-set station to the loudspeaker station. Thus in such an arrangement only a single control circuit may be employed as shown in FIGURE 1. On the other hand in a system employing two-way communication with similar loudspeakers and microphones at each station, two gain control circuits may be employed one for each direction of speech communication. Such an arrangement having two loudspeaker stations may be arranged in a manner generally similar to that shown in FIGURE 1 except that a second bridge circuit would be provided between the amplifier 16 and loudspeaker 14 controlled by filament lamps in the power supply circuit for the amplifier 17 so that, for both directions of communication, the return path gain is reduced in accordance with the speech amplitude in the forward direction.

We claim:

1. In a two-way loudspeaking telephone system; the combination at a telephone station of incoming and return speed circuits, a loudspeaker, a class B amplifier coupled to said loudspeaker to amplify the signals fed to said loudspeaker, an input circuit for said amplifier coupled to said incoming speech circuit, a power supply circuit for said amplifier, a controllable impedance, and means for controlling said impedance by the current drawn by said amplifier from said power supply circuit, said impedance being arranged in the return speech circuit to reduce the output of that circuit as the amplifier output increases.

2. A loudspeaking telephone system as claimed in claim 1 wherein said controllable impedance comprises a core with two coupled inductive windings so that current through one winding controls the impedance of the second winding.

3. A loudspeaking telephone system as claimed in claim 1 wherein said controllable impedance comprises a filament lamp, the impedance of which depends on the current passing through it.

4. A loudspeaking telephone system as claimed in claim 3 wherein the lamp is connected in shunt across the primary winding of a transformer so as to control the impedance of a secondary winding.

5. In a two-way loudspeaking telephone system; the combination at a telephone station of incoming and return speech circuits, a loudspeaker, a class B amplifier for amplifying the signals fed to said loudspeaker for communication in one direction, a direct current power supply circuit for said amplifier containing four filament lamps arranged in two pairs, the two lamps in each pair being connected in series and the two pairs being connected in shunt in the direct current power supply circuit to said amplifier, a transformer having primary and secondary windings, said primary winding being connected between the junction of the lamps of one pair and the junction of the lamps of the other pair and said secondary winding being arranged in the return speech circuit.

6. A loudspeaking telephone system as claimed in claim 5 wherein said secondary winding is connected in series in the return speech path.

7. A loudspeaking telephone system as claimed in claim 5 wherein said secondary winding is connected in one arm of a bridge circuit the other arms of which are resistive, which bridge circuit is connected in the return speech circuit with the input (return) speech signals applied across one diagonal, the output signals being taken from the other diagonal and the bridge being balanced or nearly balanced at maximum output of the forward path amplifier.

8. A loudspeaking telephone system as claimed in claim 1 and having a hand-set at one station and a loudspeaker with a microphone at the other station and wherein said current controlled impedance is arranged to control the gain of the signal of the speech path from the loudspeaker station to the hand-set station so as to reduce the loop gain when the direction of speech transmission is from the hand-set to the lourspeaker.

9. In a two-way loudspeaking telephone system; the combination at a telephone station of incoming and return speech circuits, a loudspeaker, a multi-stage amplifier coupled to said loudspeaker to amplify the signals fed to said loudspeaker, one stage of said amplifier being a class B amplification stage, a power supply circuit for said amplifier, a controllable impedance, and means for controlling this impedance by the current provided by said power supply circuit to said class B amplification stage, said impedance being arranged in said return speech circuit to reduce the output of that circuit as the amplifier output increases.

References Cited in the file of this patent

UNITED STATES PATENTS

| | | |
|---|---|---|
| 2,129,990 | Fremery | Sept. 13, 1938 |
| 2,171,048 | Rockwell | Aug. 29, 1939 |
| 2,264,311 | Herrick | Dec. 2, 1941 |
| 2,457,131 | Curtis | Dec. 28, 1948 |
| 2,497,779 | Lanham | Feb. 14, 1950 |

FOREIGN PATENTS

| | | |
|---|---|---|
| 736,988 | Great Britain | Sept. 12, 1955 |